United States Patent Office 3,431,987
Patented Mar. 11, 1969

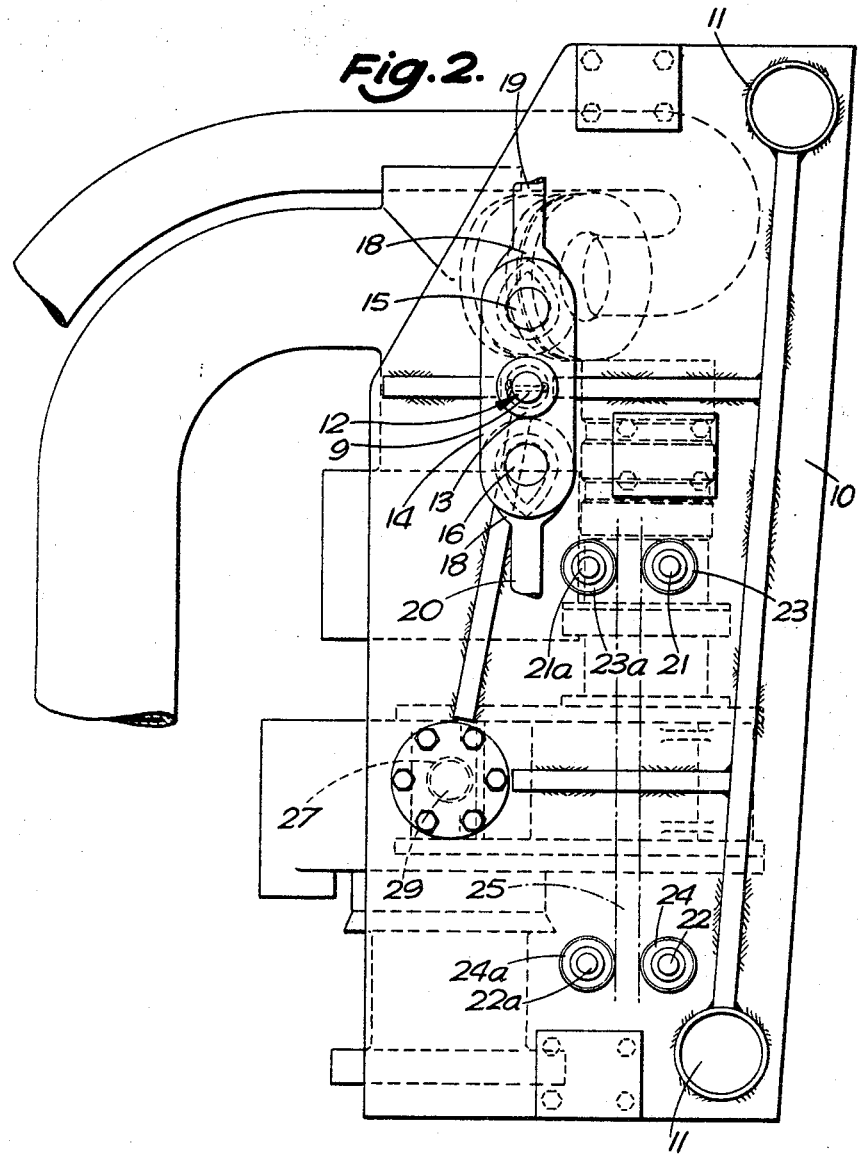

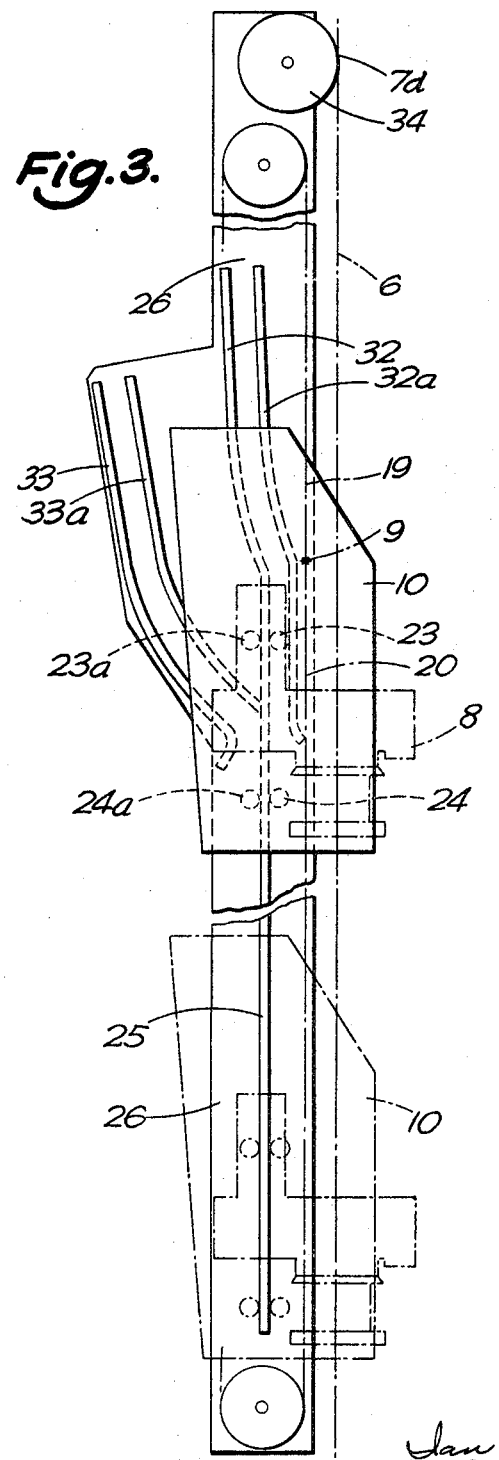

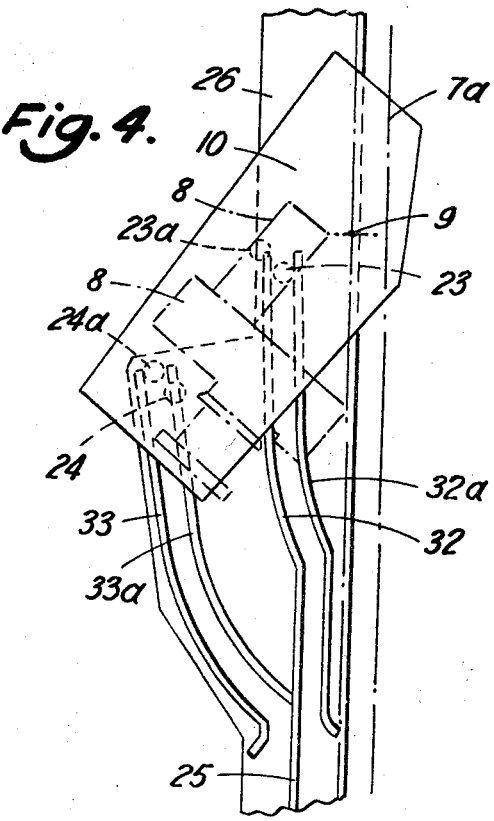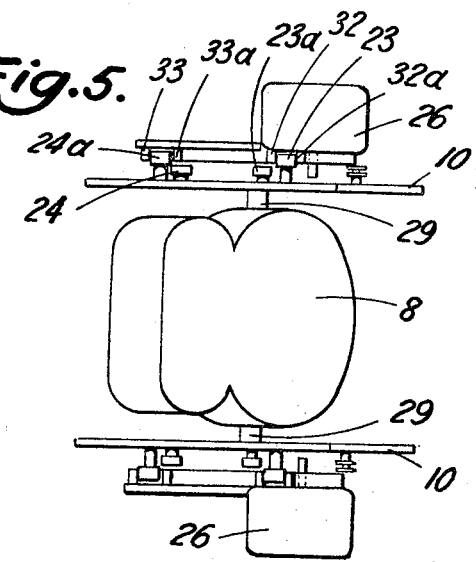

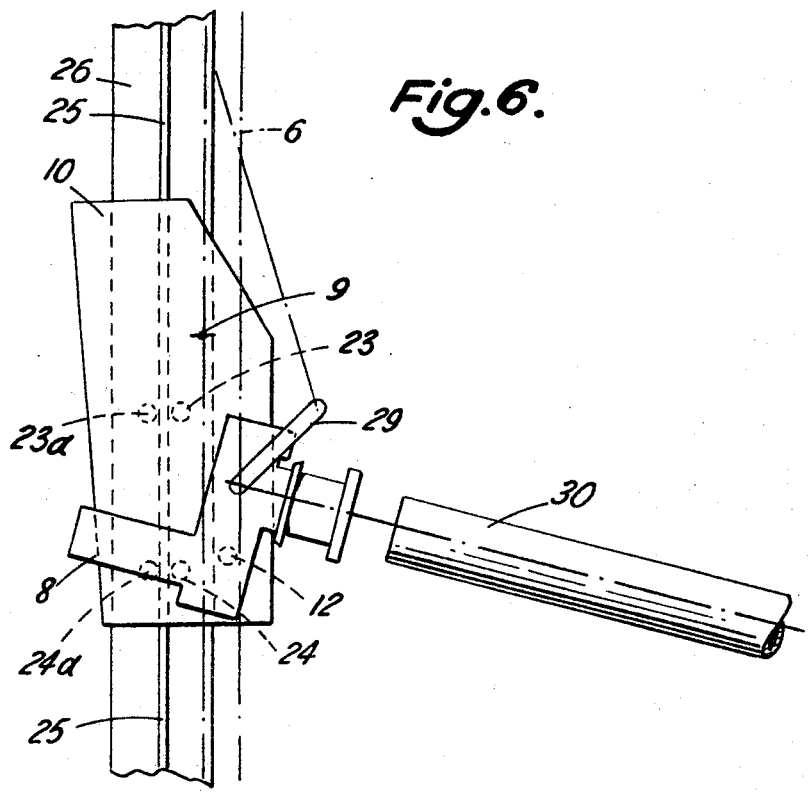
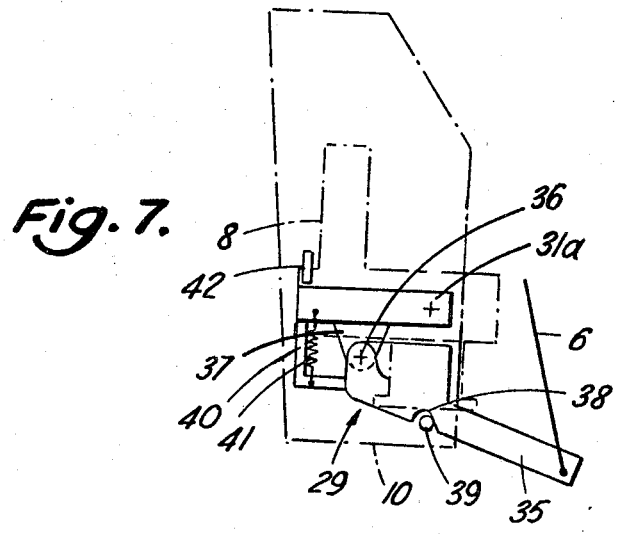

3,431,987
APPARATUS FOR TEMPORARILY STOWING DETACHABLE PORTIONS OF SUSPENDED LOADS
Ian Rendall, London, England, assignor to George Wimpey & Company Limited, London, England, a British company
Filed Sept. 25, 1967, Ser. No. 670,264
Claims priority, application Great Britain, Sept. 29, 1966, 43,544/66
U.S. Cl. 173—141   7 Claims
Int. Cl. E21b 15/00; B23b 47/26

ABSTRACT OF THE DISCLOSURE

Earth boring apparatus comprises a motor-transmission unit to which the boring tool is detachably connected. The unit is tiltably mounted in a carriage which is movable up and down on a supportng structure by a cable system. Guide tracks on the supporting structure are engaged by followers on the carriage and are so shaped that as the carriage is moved up and down on the supporting structure it is tilted about a substantially horizontal axis at the locality of attachment of the cable system to the carriage, so that the carriage is tilted to a position to facilitate attachment of a boring tool to the unit, or detachment of a boring tool from the unit.

---

This invention relates to apparatus for temporarily stowing a detachable portion of a suspended load, away from the remaining part of the load, so that operations may be carried out on the detached potrion without hindrance whereafter the detached portion may be reattached.

The invention is particularly applicable to earth boring apparatus in which a rotatable boring tube has detachably secured to its upper end a motor-transmission unit which is suspended by a cable or the like from an overhead support so that when said unit and boring tube has descended and the latter has penetrated the ground to a predetermined extent the unit may be detached and raised by the cable and the upper end of a further tube may then be attached to the unit and the lower end of the further tube attached to the first said tube whereby both tubes may then be rotated. Usually with such an arrangement the unit is attached between continuous stretches of cables extending in up and down direction between pulleys and one of the problems which arises with such an arrangement is how to move the unit laterally sufficiently to enable the drilling tubes to be attached to it without the lateral displacement of the unit also displacing the cables which support it and one object of the invention is to solve this problem.

According to this invention an apparatus for temporarily stowing a detachable portion of a load suspended by a cable system or the like from the upper end of a supporting structure comprises guide means engaging the detachable portion or part secured thereto which guide means when the detachable portion has been detached from the other part of the load and is raised, imparts tilting movement to said detachable portion about a substantially horizontal axis lying in or close to the locality of attachment of the cable system to the detachable portion.

The aforesaid guide means may comprise guide tracks on said supporting structure which are engaged by followers on said detachable portion of the load or part secured thereto and which tracks are so shaped and the followers so disposed that the above mentioned tilting movement about said axis is effected by up and down movement of the detachable portion.

In one form of construction said detachable portion of the load is mounted in a carriage provided with said followers which engage said guide tracks whereby both the carriage and detachable portion are caused to tilt by the up and down movement of the carriage and the detachable portion of the load is tiltably mounted in said carriage so that it may be brought to an appropriate position at a desired location in its up and down movement.

For example, in the case of earth boring apparatus in which the load comprises a boring tool and the detachable portion comprises a motor-transmission unit tiltably mounted in a carriage connected to the cable system and having a part attachable to and detachable from the boring tool, for deep bores it may be necessary, after a boring tool has reached its maximum limit of boring, for it to be detached from said unit which latter is then tilted in its carriage to a position where it can receive the upper end of an extension whereafter the unit is raised to a position below where the guides would impart tilting movement to the carriage and the unit is swung downwardly in its carriage so that the lower end of the extension may be connected to the upper end of the boring tool whereafter boring is recommenced by lowering the carriage and unit.

In such an arrangement the aforesaid supporting structure may be provided with an additional cable system for connection with the boring tool or extension, so that, during boring, should the lower end of the boring tool require attention said unit may be detached from the upper end of the boring tool or extension and the former is raised by the first said cable system to a position where the unit and its carriage is to be tilted about its point of attachment to the cable system, the cable of the second system is connected to the upper end of boring tool or extension which can then be raised clear of the tilted unit exposing the lower end of the boring tool for attention.

Catch means are preferably provided for holding said unit in its carriage in an operative position.

A cable may be connected between a part of the catch means and said supporting structure which when the carriage is lowered performs a dual function of releasing the catch means and tilting the unit in its carriage for receiving the upper end of the boring tool or extension.

The following is a more detailed description of the invention as applied to an earth boring apparatus, reference being made to the accompanying drawings in which:

FIGURE 2 is a side elevation of the arrangement shown in FIGURE 1 omitting the supporting structure;

FIGURE 3 is a diagrammatic side elevation of the apparatus showing the guide means on the supporting structure and said carriage and unit in an upper position before they are tilted by the guide means and also showing the carriage and unit in a lower position before the latter is tilted by the additional cable the catch means being omitted;

FIGURE 4 is a diagrammatic side elevation showing the carriage in engagement with the guide means bringing it and the unit into a tilted position;

FIGURE 5 is a plan of the arrangement shown in FIGURE 4;

FIGURE 6 is a diagrammatic side elevation showing the carriage in a lower position where said unit has been tilted in its carriage by the additional cable which has released the latch and, FIGURE 7 is a diagrammatic side elevation of the catch means.

Figure 1:
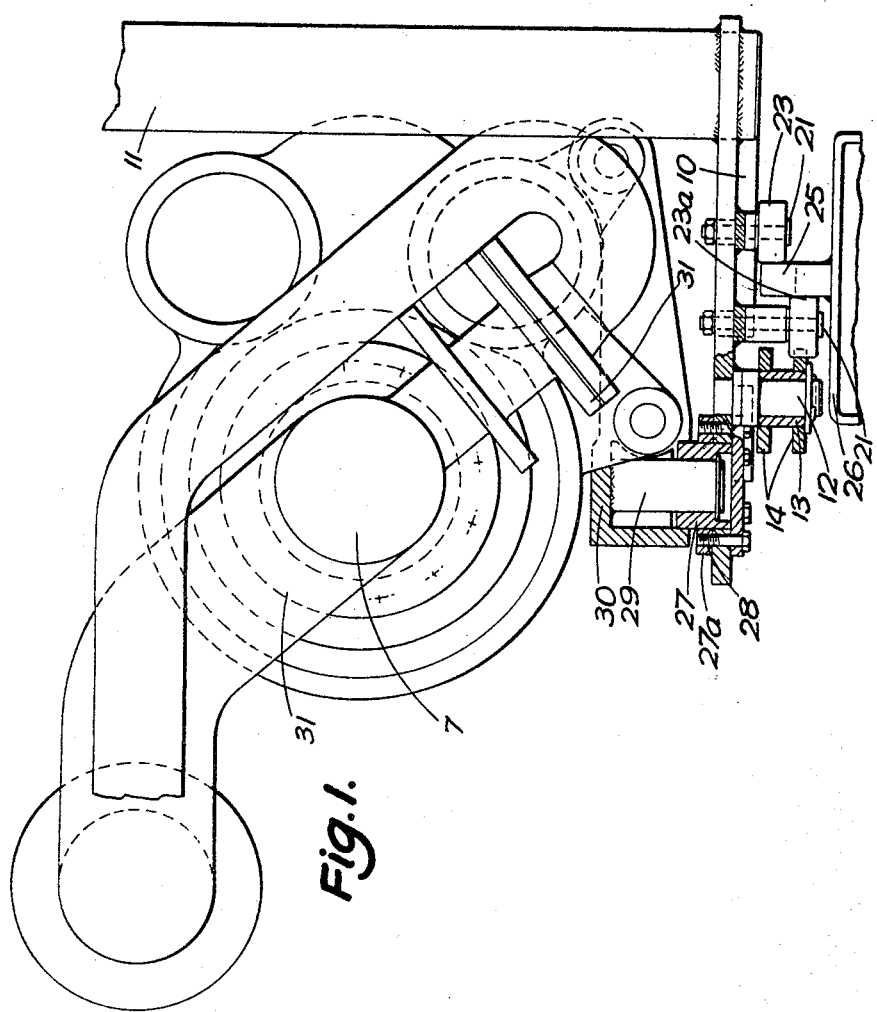
FIGURE 1 is a plan view of the aforesaid motor-transmission unit and part of its carriage and a part of the supporting structure from which the carriage is suspended.

The carriage comprises two vertical plates 10 only one of which is as shown in FIGURE 1. The two plates are secured together and spaced apart by two tubular members 11 disposed towards one of the upright edges of the plate one above the other. Projecting outwardly from each plate 10 is a pivot pin 12 which engages a bearing 13 on a link 14.

The upper and lower ends of each link are provided with pins 15 and 16 which engage sheaves 17 and 18 at the ends of up and down extending stretches 19, 20 of a cable system to which movement is imparted by a motor (not shown).

Each plate 10 has fixed to it two pairs of pins 21, 21a and 22, 22a on which are mounted ball bearing rollers 23, 23a and 24, 24a respectively. The rollers 23, 23a are out of axial alignment as are also ball bearings 24, 24a. For the greater part of the upward movement of the carriage the ball bearing rollers in each pair lie one on either side of a guide rail 25 fixed to one of the upright members 26 of the supporting structure as best seen in FIGURES 3, 4 and 6.

Fixed to each plate 10 towards the lower end thereof is a trunnion bearing 27 for which purpose the trunnion bearing is provided with a flange 27a having holes 28 through which securing screws extend. The trunnion bearings are engaged by trunnion pins 29 fixed to a part 30 attached to the mounting 31 for the motor-transmission unit 8, for rotating an earth borer (not shown) about an axis 7 which is disposed between the two vertical plates 10.

Towards the upper end of upright members 26 there are provided two pairs of spaced guide rails 32, 32a and 33, 33a and which are disposed at such a distance away from the plates 10 of the carriage that only the rollers 23, 24a respectively lie between them. These rails are so shaped that as the plates 10 are drawn upwardly they tilt about an axis of the pivot pin 12 on the link 14 which connects the stretches 19 and 20 of the cable system as shown in FIGURE 4.

In each of FIGURES 3, 4 and 6 the centre line of the bore hole is indicated at 7a and it will be seen from FIGURE 4 that when the carriage 10 and unit are tilted in their uppermost position the unit 8 is well clear of this centre line.

The apparatus may be provided with an additional pulley and cable system operated by another winch so that when the motor-transmission unit 8 and the carriage constituted by the plates 10 are in the position of FIGURE 4 the boring tool and extension may be drawn upwardly by the additional system and passes between the plates 10 clear of the unit 8 thus enabling the boring tool to be examined. When the tool is again lowered by the additional system into an operative position the stretches 19 and 20 of the main cable system are brought into operation to lower the carriage 10 and unit 8 and the aforesaid guides 32, 32a, 33 and 33a move the carriage 10, into the chain line position shown in FIGURE 3. The unit is retained in the position shown in FIGURES 3 and 4 in relation to the carriage 10 by a catch indicated at 29 in FIGURE 6 and more fully illustrated in FIGURE 7. This catch is automatically brought into and out of operation by the downward and upward movement of the carriage, and for this purpose the cable associated with the additional system is attachable to a part of the catch mechanism or there is provided an additional cable 6 shown in FIGURES 6 and 7, the upper end of which is tethered to a fixed anchorage (not shown) and the lower end of which is connected to an arm 35 pivoted at 36 to a bracket 37 rigidly fixed to a part 31a of the mounting 31 for the motor and transmission unit 8. The weight distribution of the unit 8 is such as to tend it to cause it to rotate clockwise in the direction shown in FIGURES 3 to 7.

The automatic release of the catch mechanism can best be understood by a reference to FIGURE 7. As indicated above either the cable of the additional cable system or the cable 6 is attached to the arm 35 which is pivotally connected at 36 to a bracket 37 fixed to a part 31a attached to the unit 8. The arm 35 is provided with a socket 38 on the underside thereof which in the position shown in FIGURE 7 accommodates a pin 39 on one of the plates 10 of the carriage. A cranked lever arm 40 on the arm 35 is drawn towards the part 31a by a spring 41 and it will be noted that the part 31 engages an abutment 42 fixed to one of the plates 10. During the lowering of the carriage, since the cable of the additional system or the cable 6 is stationary, the arm 35 will be rotated clockwise bringing the socket 38 clear of the pin 39 and the cranked arm 40 will be brought out of engagement with the part 31a on the unit 8. Further lowering movement and anticlockwise rotation of the arm 35 will bring that arm into engagement with the underside of the part 31a on the unit, thus swinging the unit anticlockwise in relation to the plate 10 of the carriage bringing the unit 8 into the position shown in FIGURE 6 when it may have attached to it the drill or drill extension. The carriage 10 may then be raised, in so doing the cable 6 becomes slack and the weight distribution of the unit 8 and the spring 41 will cause the lever arm 35 to swing clockwise under the action of the spring 41 and the unit 8 will also swing clockwise relative to the carriage due to its weight distribution and further upward movement will bring the part back into the position shown in FIGURE 7.

I claim:

1. Apparatus comprising: a supporting structure; a cable system carried by the supporting structure; a load suspended on the supporting structure by the cable system and comprising a portion attached to the cable system and detachable from the remaining part of the load; means for operating the cable system to raise and lower the load with respect to the supporting structure; guide means on the supporting structure engaging the detachable portion; which guide means are adapted to impart tilting movement to the detachable portion, as it is raised and lowered, about a substantially horizontal axis at the locality of attachment of the cable system to the detachable portion.

2. Apparatus according to claim 1 wherein the guide means comprise guide tracks on said supporting structure, followers mounted on said detachable portion engaging the guide tracks, which tracks are shaped the followers are disposed so that said tilting movement is effected by up and down movement of the detachable portion.

3. Apparatus according to claim 2 and comprising a carriage in which the detachable portion is mounted the followers being provided on the carriage whereby both the carriage and detachable portion are caused to tilt by up and down movement of the carriage, and wherein the detachable portion of the load is tiltably mounted in the carriage.

4. Apparatus according to claim 3 wherein the remaining part of the load comprises a boring tool and the detachable portion comprises a motor-transmission unit having a part attachable to and detachable from the boring head.

5. Apparatus according to claim 4 and further comprising an additional cable system mounted on the supporting structure and for connection with the boring tool.

6. Apparatus according to claim 4 and further comprising catch means for holding the unit in an operative position in its carriage.

7. Apparatus according to claim 6 and further comprising a cable connected between a part of the catch means and the supporting structure, which cable, when the carriage is lowered performs a dual function of releasing the catch means and tilting the unit in its carriage.

References Cited
UNITED STATES PATENTS

| | | | |
|---|---|---|---|
| 474,206 | 5/1892 | Bervin | 173—141 X |
| 2,023,966 | 12/1935 | Montee | 173—141 X |
| 2,622,847 | 12/1952 | Baldry | 173—141 X |
| 2,919,899 | 1/1960 | Hitchcock | 175—220 X |
| 3,061,011 | 10/1962 | Paget | 175—85 X |
| 3,312,294 | 4/1967 | Wilson | 175—85 X |

NILES C. BYERS, JR., *Primary Examiner.*

U.S. Cl. X.R.

175—220